Dec. 18, 1951      I. W. EDWARDS      2,579,227

CONDUCTOR

Filed July 16, 1945

INVENTOR.
*Irving W. Edwards*
BY
*Christie & Angus*
ATTORNEYS

Patented Dec. 18, 1951

2,579,227

UNITED STATES PATENT OFFICE 2,579,227

CONDUCTOR

Irving W. Edwards, Detroit, Mich.

Application July 16, 1945, Serial No. 605,319

7 Claims. (Cl. 287—20.3)

This invention relates to electrical connecting conductors, and more particularly to conductors of the type commonly known as jumpers or ground straps used for establishing electrical continuity.

The principal object of my invention is to provide an electrical connection or bond of this type which may easily be applied by workmen in the art and which provides a good electrical connection which is maintained secure in spite of shocks and vibrations or other factors which tend to loosen or impair the connection.

My connectors are particularly applicable as rail bonds and may also be used to establish electrical connections to such structures as steel shapes, bus bars and pipe lines.

In railway track circuit signalling which is an important field of use of my connector or bond, it is the practice electrically to connect each rail to the next by an electrical conductor or rail bond of low enough resistance efficiently to conduct the relatively small signal currents along the rails. The bond ordinarily comprises a flexible electrical conductor long enough to extend from a point near the butt end of one rail to a similar point near the butt end of the next, with sufficient slack to allow for vibration and expansion and contraction of the rails and for play in worn bolts and bolt holes. Each end of this flexible cable is securely attached to and terminated by a stud adapted to be fitted into a hole bored in the rail head, or the web of the rail.

Various means have heretofore been proposed for effecting a good electrical connection between the stud and the rail and for holding the stud securely in the bore to maintain the connection. According to one such proposal, a bore is formed centrally within the stud, and a pin is placed in this stud bore, after which the stud is hammered into the bore of the rail head, thereby wedging the pin in the stud bore to expand the stud against the rail bore and hold the connector in place.

I have found that such prior known connectors, while many times giving good service, frequently cause trouble, sometimes because of imperfect electrical connection or breaking of the stud and sometimes because the stud can be vibrated out of the hole. I have overcome these undesirable features of the prior known connector studs by the use of a centering ball, preferably of a very hard metal with a polished surface such as a hardened ball bearing. I accommodate this within a tapered recess formed within the stud from which a part of the ball protrudes beyond the end of the stud. Furthermore, I provide the bore in the rail with a cupped or conical base.

By reason of the proportioning of the parts so that the ball located in the recess of the stud projects somewhat beyond the end of the stud, provision is made for the ball to center itself at the cupped base of the bore in the rail head, thereby bringing the stud to a centered position. Because of this centering feature, the stud can be driven home by hammer blows without undesired cocking or offsetting and a secure sealing against moisture and locking of the stud in the bore is provided with attendant good electrical connection. This sealing and locking of the stud in the bore occurs primarily at the region near the outer end of the stud, resulting in the efficient type of locking had by use of my connector, with little or no tendency of the stud to shear or break off at the base.

By appropriately shaping the stud recess, I am enabled by the use of the ball, to adapt the connector to many kinds of applications, both as rail bonds and as connectors for other purposes.

Another feature of my invention is the provision of a parallel arrangement of a plurality of electrical connecting cables to the terminal. Not only does this tend to maintain better electrical continuity, but it also has a mechanical advantage of adapting itself to a desirable serpentine form of crimping whereby an excess length of the cable can be held close to the member to which it is connected, for example the side of a rail head.

The foregoing and other features of my invention will be better understood from the following detailed description taken in conjunction with the accompanying drawing, of which:

Figures 1, 2:
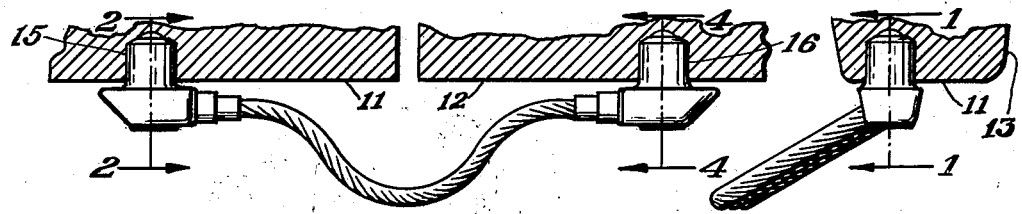
Fig. 1 is a partial view, in horizontal cross-section taken at lines I—I of Figs. 2 and 4, through the railheads of a pair of abutting rails, showing the rails connected by a rail bond according to my invention.
Fig. 2 is a partial vertical cross-section view through a railhead, taken at line 2—2 of Fig. 1, showing the connecting stud and its cable.
Figures 3, 4:
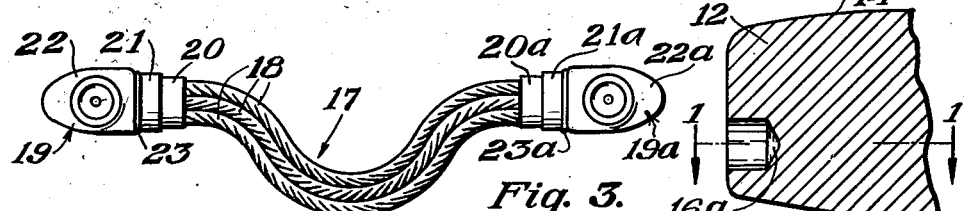
Fig. 3 is a front elevation view of the railbond shown in Fig. 1.
Fig. 4 is a vertical cross-sectional view showing part of a rail, the cross-section being taken through a stud hole in the railhead, for example at line 4—4 of Fig. 1.

In Fig. 1 there are shown the abutting ends of the heads of adjacent rails 11 and 12 in a railroad track, the ends of the rails having the usual clearance between them. In the figure, the rails are shown in a horizontal cross-section taken at lines 1—1 of Fig. 2 and of Fig. 4. Fig. 2 shows a vertical cross-section through rail 11, the top of the rail on which the wheel rolls being indicated as 13. Fig. 4 shows a vertical section through rail 12, the top of the rail being marked 14. In each of Figs. 1, 2 and 4, only a portion of the section through the rails is shown, enough to illustrate the application of my invention.

For the purpose of applying my connector to the rails, I provide a bore in the side of the railhead near the abutting end of each rail, the bore in rail 11 being numbered 15 and the bore in rail 12 being numbered 16. Each bore is of a cylindrical shape such as may be made by an ordinary drill, and the end of each bore is brought to somewhat of a point or apex which may be, for example, cone-shaped, as shown at 16a in Fig. 4. This shape need not necessarily be exactly conical, nor brought to a definite point, but should be cupped somewhat similar to a cone, so that a ball may readily set itself therein in one definite position. This shape of the base or termination of the bore, I call herein cup-shaped regardless of whether it is exactly conical or somewhat curved or rounded.

Figures 5, 5A, 6:
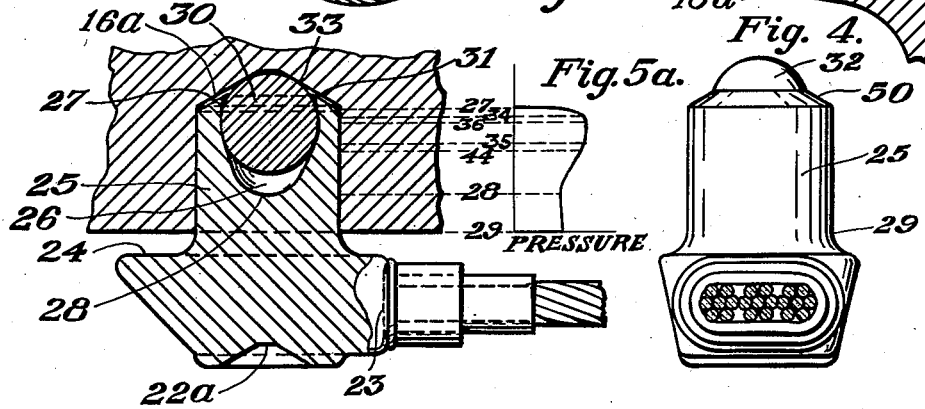
Fig. 5 is an enlarged partial view partially in cross-section, taken at the same horizontal section as Fig. 1, and showing in detail the construction of the stud with its recess and ball.
Fig. 5a shows graphically the pressure distribution of one of the driven studs of my invention.
Fig. 6 is a side view of the stud of Fig. 5, made according to my invention, the cable wires being shown in cross-section.

For the purpose of electrically connecting the abutting rails, I provide a connector 17 according to my invention. The connector, or rail bond 17 comprises an electrical conducting cable, or preferably a plurality of parallel cables 18, terminated at their respective ends in terminal members 19 and 19a. The arrangement used for fastening the cable to the terminal members is a system of concentric sleeves 20 and 21, welded to terminal 19, and sleeves 20a and 21a welded to terminal 19a. To make the connection, the heads 22 and 22a may be concaved to some extent at their ends next to the cable; and the outer sleeve 21 with the inner sleeve 20 firmly telescoped in it, is then set into the cavity and welded at 23. Similar construction is used at the other end of the cable at 20a, 21a, 22a and 23a. The cable wires themselves may be suitably attached within the inner sleeve by any suitable means such as swaging, soldering or welding, or any or all. The inner surface of each terminal member 19, adapted to be placed parallel with the side of the railhead, is made flat at 24 (Fig. 5). A stud 25 protrudes perpendicularly from the flat inner surface, and the stud is of a size and shape to fit snugly in the bores 15 and 16 in the railhead. Preferably the stud is bevelled somewhat around the circumference at its forward end as shown at 50 to facilitate starting it in the bore.

A recess 26 is provided centrally within the end of each stud. The recess is so shaped that its widest dimension or diameter is near the end of the stud at a position 27, and narrows down toward the base 28 of the recess. The recess is purposely so shaped that its successive cross-sections in going from the outer end of the stud toward the base 28 are circles of decreasing diameter. This shape of the recess enables a ball 30 to be placed in the recess far enough so that the maximum diameter of the ball goes down past the edge of the recess at 31. The ball can accordingly be held against falling out of the recess by crimping in the leading edge 31 of the stud around the ball, as shown in Fig. 5, while still allowing somewhat less than a hemisphere of the ball to protrude at 32, beyond the stud. The ball is preferably of a very hard non-deformable material, such as a hardened steel ball-bearing, and its surface is preferably provided with a good smooth finish or polish. The material of the stud is likewise a metal but not as hard as the ball. It may be made of a somewhat softer steel or of bronze or the like, which will flow when forced by the hard ball.

To establish a connection by the use of my connector, the stud is inserted into the bore 15 and then driven by a suitable driving or hammering operation. If the outer edge of the stud is tapered, as described above, the stud can easily be started, and can have a shape to conform with the cupped bottom 16a of the bore. As the stud is pushed into the bore, it should be preferably fit snugly, although it can be well fastened into the bore even though the bore be somewhat oversize. The forward part of the ball should be set against the inner conical or cupped part of the bore at the circle of contact marked 33 in Fig. 5, which will serve to center the ball and stud even though there may be some other slight misalignment between the stud and the bore. The stud should be proportioned so that when the ball strikes the conical or cupped portion of the bore, the forward annular edge 31 of the stud should remain separated at some distance from the end 16a of the bore as shown in Fig. 5.

For the purpose of the driving, it will be convenient to apply a driving punch to the recessed head 22a of the stud, and then hammer on the punch. Upon the commencement of the hammering, the driving of the stud further forward against the maximum diameter of the ball will serve to expand the stud outwardly toward a larger diameter near its forward end at about the position of maximum diameter of the ball, thereby locking the stud to the rail near the forward end of the stud. This initial locking serves as a backing by which the stud is further upset progressively, upon further driving, so that the locking area progresses from near the tip end of the stud toward the base of the stud. This upsetting and locking will continue progressively as the stud is driven so that the ball is forced further and further inward into the recess of continually diminishing cross-sections.

As a rough approximation, the area of greatest pressure tending to bind the stud into the bore exists from the region of about point 34 to point 35 around the stud. There is little or no pressure at the tip end of the stud 27, inasmuch as the main diameter of the ball is considerably further into the recess than this point. Furthermore, since the base 28 of the recess is usually a considerable distance within the bore at the wall, there is then appreciably less than the maximum pressure at the base 29 of the stud against the outer edge of the wall. This gradient of binding or locking pressure of the stud against the wall is illustrated graphically for a railhead bond in Fig. 5a, and contributes greatly to the efficient bonding and holding effect of my bond, while at the same time effecting an efficient seal against seepage into the bore, and providing a good electrical connection of the bond to the wall. In Fig. 5a the ordinate is scaled in accordance with distances along the stud, and points on the ordinate scale are transferred directly across from corresponding points of the stud in Fig. 5. The abscissas represent units of pressure of the stud against the bore in the railhead. As will be seen from the curve, the maximum binding pressure occurs at region 36, which is the region of maximum diameter of the ball. The region of high pressure extends inwardly as far as region 34 of the stud which is approximately the original place of maximum diameter at the bore before the ball started to move inwardly into the recess. Owing to the flow of stresses, the high pressure region continues for a distance toward the base of the stud, approximately to the point 35, at about the base of the seating ball. From this point the pressure drops off quite rapidly as at 44 where contact of the ball with the stud ends. At the extreme tip 27, the pressure is approximately zero.

A desirable pressure relationship for typical bond installation in railheads is shown in the pressure diagram, Fig. 5a; but for installations where impact or vibration is less, as in pipe line shunts, and where the greatest degree of conductivity is essential, the pressure areas can be modified throughout the length of the stud by changing the diameter of the ball, the taper or contour of the recess within the stud, and altering the physical properties of the stud or the length of the recess therein. For instance, a small ball necessitates a relatively thicker wall of the stud at the tip and with a shallow recess the main body of the stud would be comparatively long. Such a design would produce a moderate wall pressure at 27 while the upsetting action on the stud would expand it at the entrance into the bore, say 29, which would tend to block off further upsetting inwardly toward the relatively distant bottom of the recess 28, thus giving a maximum of wall pressure at the point of entrance of the stud in the bore. Such a design would be required to insure the utmost in sealing of the bore against seepage of corrosive brine, acids or gases.

Figure 7:
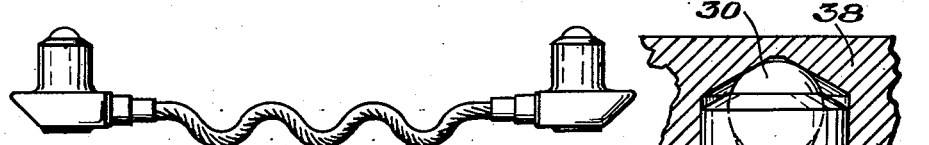
Fig. 7 is a top view of a rail bond made according to my invention, showing the connecting cable arranged in a serpentine manner.
Figures 8, 9:
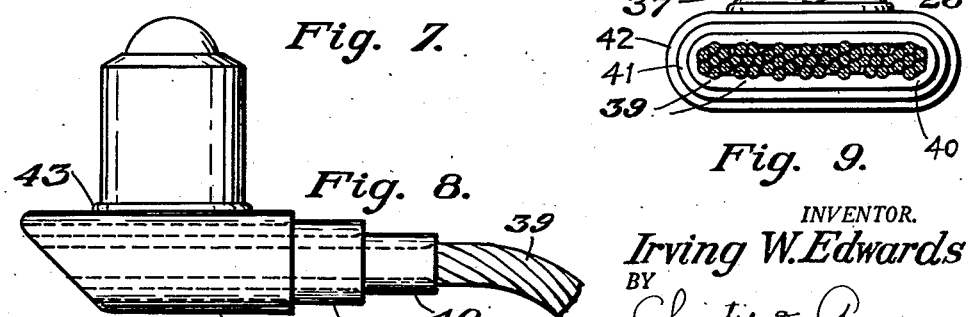
Fig. 8 is an enlarged view of an undriven rail bond according to my invention, showing the attaching stud welded to sleeves which enclose the cable.
Fig. 9 is a view partially in cross-section showing a short connecting stud according to my invention adapted for connection with a metallic member or the like, and showing a multiple cable entry into the sleeving attached to the stud.

Fig. 9 shows a modification of the stud construction adapted for use with shallower devices than railheads, for example with metal plates of limited thickness. In this figure, the stud 37 is shorter with respect to its diameter than is the stud in Figs. 1 to 8; and it is proportioned this way in Fig. 9 to accommodate itself to the rather shallow, flat piece of metal 38, into which it is inserted. Apart from the change in proportion, the construction is similar to that in Figs. 1 to 7 and involves the use of the ball 30 inserted in the recess 26 of the stud and fitted against the cupped base of the bore.

The cable arrangement comprises a sevenstrand rope construction cable comprising the seven cables 39 side by side, as shown in Figs. 8 and 9. Preferably, the cables are arranged so that the lays of the cable wires are alternately left-lay and right-lay. In this way, the outer individual wires of contiguous strands lie in the same direction, thereby reducing wear under vibration which might otherwise occur if the wires of the lays were crossing each other where they are in contact. These are placed within the oval-shaped sleeve 40 which is telescoped within the larger similar shaped sleeve 41. The two sleeves are telescoped within the head 42 of the stud which in this embodiment has an oval cross-section similar to that of the sleeves. These sleeves are preferably compacted and sweated together to insure efficiency in driving, particularly in the region of the stud. The stud may be soldered, sweated, brazed or welded at its solid end as indicated at 43, to the cable and sleeve of the terminal.

By my invention, I have provided a connector adapted for use in many situations and especially suited for use as a railbond. My connector is characterized by the simplicity of its application and the ease of its installation with comparatively untrained labor, coupled with its essential permanence and good electrical connection. By reason of the arrangement of the ball held in its socket or recess by the crimped-over tip of the stud, the connector can be carried around without loss of the ball.

By reason of the conical or curved tapering or cupping of the base of the bore in the member to be connected, in cooperation with the ball in the socket, the connector is self-centering, that is, the ball is automatically centered into the bore. This feature substantially reduces or eliminates the tendency of misalignment of the stud in the hole, that is, avoids the tendency to "cocking over" or faulty driving, which has heretofore been experienced in the use of prior-known connecting devices. Furthermore, the permanence or holding capacity of my stud connector is greater than that heretofore experienced in the use of stud connectors. This greater holding effect is doubtless due to the progressive upsetting of the metal of the stud as the ball progresses into the recess, over a substantially large area at the circumference of the stud, coupled with the fact that this binding or high pressure area exists from near the tip of the stud rather than from near the base. By reason of this form of pressure gradient, as illustrated in Fig. 5a, the pounding of heavy locomotives and cars on the tracks does not have as much effect in loosening my stud as in the case of prior known connectors; and furthermore, owing to the lack of excessive binding pressure at the base of the stud, that is the rail face, the vibration and shocks are not as apt to break off the stud there.

Moreover, by reason of my construction, comprising the above-noted type of gripping action there is not as much tendency nor need, usually, for the stud to upset or deform at the base, as in the use of the other types of connectors. Such excessive upsetting near the base of the stud is an extreme disadvantage as it would tend to resist further driving in of the stud near its end and thereby reduce the desired holding effect near the tip of the stud. The progressive increase of the gripping area from near the tip toward the base has a further advantage of squeezing out from the bore hole of any undesirable moisture or other foreign matter which might be condensed or introduced into the hole, thereby minimizing the presence of substances which might otherwise tend to produce high resistance or corrosion in the connection.

My connection maintains throughout a long period of its life a high degree of electrical conductivity inasmuch as the ball is always maintained in firm contact with the cup of the bore, while at the same time the metal of the stud is firmly bound against the wall of the bore over a wide area.

My novel bond construction is furthermore especially well suited for extraction from a rail or other location by simple extracting means without breaking off of the stud in the rail or device. This results from the fact that the maximum holding power is toward the tip end of the stud rather than the base end. In consequence, when a pulling or extracting force is applied between the railhead and the head of the stud, the stud tends to neck down somewhat at its base at 29, and this necking down tends to continue progressively toward the tip end of the stud, until the stud is finally freed without breaking.

The tendency toward loosening or actually falling out from the railhead of prior known types of connectors has been due to a lack of sufficient gripping or holding power, in the case of studs which can be easily underdriven; while in the case of those prior known kinds of connectors in which the studs can be overdriven, the studs have often actually forced themselves out by reason of the excessive pressure from their own overdriven flowable elements. By reason of my stud construction, however, this danger of loosening and falling out is greatly reduced or eliminated by reason of the stable, virtually incompressible and distortion-resistant ball embedded in a tough shell of the stud which is only somewhat less hard than the ball. My design encompasses two distinct means of expansion of the stud; one agency is the expansion by means of the wedging of the ball, localized near the tip of the stud, and the other is the upsetting of the stud itself, this upsetting being subsequent to the wedging by the ball and carried on progressively and controlled by the contour of the recess to any required degree in the successive changes in cross-sectional area of the stud.

My arrangement of multiple-connecting cables arranged in a parallel row and attached by the telescoped sleeves, is of particular advantage in the application to which I put these connectors. In rail bond work, it is a very important consideration to be able to see a broken cable before the continuity of the electrical circuit is interrupted. If only a single cable connector were used, this breakage would disrupt the electrical system. If, however, multiple cables are used, the breakage of one of the cables can be seen without interrupting the continuity.

The arrangement of telescoped connecting sleeves has particular advantage in rail bond work wherein the cables are subjected to heavy vibration, because the sleeves tend to protect the cable against damage from the vibration. By reason of use of the plurality of telescoped sleeves, with the inner sleeve extending further out along the cable than the outer sleeves which terminate near the head, the rigidity of the cable connection or termination is increased toward the head. This progressive increase in rigidity or increase of stiffness toward the connector head plays a very important part in absorbing vibrations. In addition to the function of allowing more flexibility toward the outer end of the inner sleeve than at the head itself, these telescoped connector sleeves have the additional advantage of increasing the dampening effect. The reason for this is that the individual vibrational resonance frequencies of the several telescoped sleeves will be different and in consequence they will not all vibrate naturally at the same period.

My use of parallel cable wires has a further advantage in that it is possible to obtain a serpentine effect of the cable as shown in Fig. 7 by the use of multiple cables, whereas by the use of only a single cable only a single loop of the cable such as shown in Fig. 1 would be practical. The ability to form into the serpentine shape is of considerable advantage, which resides in the fact that a given over-all length of cable can be brought closer to the rail itself than when only a single loop is used as shown in Fig. 1. It is an advantage to have the cable and the terminal head hug close to the rail, as in this way it is less apt to be damaged by extraneous devices or tools brought in proximity to it, or by vehicles passing over the track and dragging equipment over the rails and the cables.

It will be recognized from the foregoing description and statement of advantages that my connectors are useful in many applications, and are not necessarily limited to rail bonds or the particular applications mentioned. Furthermore, it will be apparent that it is not necessary to put connecting studs on both ends of the cable, as in some cases it may be desirable, or required, only to put the stud on one end for connection with an electrical member, while attaching the other end of the cable to a position or terminal in some other manner, for example, soldering or welding.

I claim:

1. An electrical terminal adapted to be locked within a bore provided in a member to be connected with the terminal, said terminal comprising a head adapted to be driven, a stud protruding from the head and adapted to be inserted within the bore, a recess centrally located within the end of the stud remote from the head, a ball of harder material than the stud permanently anchored within the recess and only partially protruding from the end of the stud in the unexpanded condition of the stud so as to engage the base of the bore when the stud is inserted thereinto, the cross-section areas of the recess in the unexpanded condition of the stud progressively and uninterruptedly diminishing from the cross section substantially at the maximum diameter of the ball inwardly toward the head of the terminal and to a point spaced inwardly of the ball.

2. For use with an electrical conducting member having a cylindrical bore terminating in a cupped base, an electrical terminal adapted to be locked within said bore, said terminal comprising a head adapted to be driven, a cylindrical stud protruding from the head and adapted to be inserted within the bore, said stud having a recess centrally located within the end of the stud remote from the head, a spherical ball of harder metal than the stud metal permanently anchored within the recess so as to protrude through the outer end of the recess beyond the end of the stud when the latter is in unexpanded condition, said ball having the major portion thereof housed within the recess and being spaced from the bottom of the recess to permit the ball to move inwardly within the recess to expand the stud within the bore upon driving the head, said recess in the unexpanded condition of the stud having the walls thereof progressively tapering inwardly from a point substantially at the diameter of the ball to a point spaced inwardly of the ball.

3. For use with an electrical conducting member having a cylindrical bore terminating in a cupped base, an electrical terminal adapted to be locked within said bore, said terminal comprising a head adapted to be driven, a cylindrical stud protruding from the head and adapted to be inserted within the bore, said stud having a recess centrally located within the end of the stud remote from the head, a spherical ball of harder metal than the stud metal permanently anchored within the recess so as to protrude through the outer end of the recess beyond the end of the stud when the latter is in unexpanded condition, said ball having the major portion thereof housed within the recess and being spaced from the bottom of the recess to permit the ball to move inwardly within the recess to expand the stud within the bore upon driving the head, said recess having the cross-section areas thereof progressively diminishing inwardly from a point approximately at the diameter of the ball when the stud is in unexpanded condition to a point spaced inwardly of the ball.

4. An electrical connector adapted for connection into a bore having a base, said connector comprising a head and a stud having its base at the head, said stud being adapted to fit into the bore and having a centrally located recess formed in its outer end, a spherical ball mounted within the outer end of the recess in such position as to protrude beyond the end of the stud in the unexpanded condition of the stud, the outer portion of the recess being in the form of a socket smoothly embracing more than a hemisphere of the ball to anchor the same within the recess in spaced relation to the bottom of the recess, the circular cross-section areas of the walls of the recess in the unexpanded condition of the stud progressively and uninterruptedly diminishing from approximately the circular cross-section area of maximum diameter of the socket toward the base of the stud to a point spaced inwardly of the ball, whereby as the ball is driven into the recess the degree of lateral pressure exerted thereby against said walls will progressively increase and the ball will be locked within the recess in any position thereof.

5. An electrical connector adapted for connection into a bore having a base, said connector comprising a head and a stud having its base at the head, said stud adapted to fit into the bore and having a centrally located recess formed in its outer end, a spherical ball of harder material than the stud mounted within the outer end of the recess in such position as to protrude beyond the end of the stud in the unexpanded condition of the stud, the outer portion of the recess being in the form of a socket smoothly embracing more than a hemisphere of the ball to anchor the same within the recess in spaced relation to the bottom of the recess, the circular cross-section areas of the walls of the recess in the unexpanded condition of the stud progressively and uninterruptedly diminishing from approximately the circular cross-section area of the diameter of the ball toward the base of the stud to a point spaced inwardly of the ball, whereby as the ball is driven into the recess the degree of lateral pressure exerted thereby against said walls will progressively increase and the ball will be locked within the recess in any position thereof.

6. An electrical terminal adapted to be locked within a cylindrical bore provided in a member to be connected with the terminal, said terminal comprising a head adapted to be driven, a cylindrical stud protruding from the head and adapted to be inserted within the bore, a recess centrally located within the end of the stud remote from the head and terminating at its outer end a substantial distance away from the head, a ball of harder metal than the stud permanently anchored within the recess a distance from the inner end thereof so as to protrude from the outer end of the stud in the unexpanded condition of the latter, said recess in the unexpanded condition of the stud having circular cross-section areas which diminish in size progressively from a point corresponding substantially to the diameter of the ball in the direction of the base of the stud and to a point spaced inwardly of the ball, said ball being adapted to engage the base of the bore and the surface of the recess, whereby driving of the stud into the bore causes the ball to enter further into the recess with attendant flowing and expansion of the stud metal in front of the greater diameter of the ball and against the wall of the bore so that the locking pressure of the stud against the bore is initially along the surface of the stud near its tip.

7. An electrical terminal for a flexible electrical conducting cable comprising a head adapted to be hammer driven, a cylindrical metallic stud protruding from the side of the head opposite that to be driven, a recess centrally located within the end of the stud remote from the head, a ball of harder metal than the stud metal permanently anchored within a socket in the recess a distance from the inner end thereof so as to protrude from the outer end of the stud a distance less than a hemisphere in the unexpanded condition of the stud, said recess in the unexpanded condition of the stud having circular cross-sections which progressively diminish in size substantially from the mid point of the socket in the direction of the base of the stud to a point spaced inwardly of the ball, whereby when the stud is driven into a bore the material of the stud will flow forward of the maximum diameter of the ball and envelop part of the forward portion of the ball and expand against the wall of the bore.

IRVING W. EDWARDS.

REFERENCES CITED

The following references are of record in the file of this patent:

UNITED STATES PATENTS

| Number | Name | Date |
| --- | --- | --- |
| 608,178 | Cock | Aug. 2, 1898 |
| 709,878 | Daniels | Sept. 30, 1902 |
| 856,127 | Brennan | June 4, 1907 |
| 886,515 | Jude | May 5, 1908 |
| 1,189,235 | Brown | July 4, 1916 |
| 1,687,297 | Larson | Oct. 9, 1928 |
| 1,938,563 | Deems | Dec. 5, 1933 |
| 2,314,737 | Sabol | Mar. 23, 1943 |
| 2,405,111 | Carlson | Aug 6, 1946 |
| 2,427,518 | Bergan | Sept. 16, 1947 |

FOREIGN PATENTS

| Number | Country | Date |
| --- | --- | --- |
| 288,813 | Great Britain | Apr. 19, 1928 |